United States Patent
Jones et al.

(10) Patent No.: US 8,967,092 B1
(45) Date of Patent: Mar. 3, 2015

(54) INLINE COOLING FAN REVERSER

(71) Applicants: Kirk Jones, Vista, CA (US); Kenneth Wayne Metzler, Fallbrook, CA (US)

(72) Inventors: Kirk Jones, Vista, CA (US); Kenneth Wayne Metzler, Fallbrook, CA (US)

(73) Assignee: ProManPTO, LLC, Vista, CA (US)

( * ) Notice: Subject to any disclaimer, the term of this patent is extended or adjusted under 35 U.S.C. 154(b) by 0 days.

(21) Appl. No.: 14/058,107

(22) Filed: Oct. 18, 2013

Related U.S. Application Data (60) Provisional application No. 61/715,807, filed on Oct. 18, 2012.

(51) Int. Cl.
  *F01P 7/02* (2006.01)
  *F04D 27/00* (2006.01)
(52) U.S. Cl.
  CPC .................................. *F04D 27/00* (2013.01)
  USPC ...................................................... 123/41.12
(58) Field of Classification Search
  USPC ........... 123/41.12, 41.49, 1 R, 196 S, 198 D, 123/195 E; 165/266, 271; 180/68.1–68.4
  See application file for complete search history.

(56) References Cited

U.S. PATENT DOCUMENTS

| | | | | |
|---|---|---|---|---|
| 3,139,924 A | * | 7/1964 | Schreiner | 62/160 |
| 4,116,265 A | * | 9/1978 | Staebler | 165/95 |
| 7,121,368 B2 | * | 10/2006 | MacKelvie | 180/68.1 |

FOREIGN PATENT DOCUMENTS

| | | | | |
|---|---|---|---|---|
| JP | 58103108 A | * | 6/1983 | H01F 27/08 |
| JP | 61086598 A | * | 5/1986 | F28G 1/16 |
| JP | 04019322 A | * | 1/1992 | F01P 5/02 |

* cited by examiner

*Primary Examiner* — Hung Q Nguyen
(74) *Attorney, Agent, or Firm* — Joseph C. Andras; Myers Andras LLP (57) ABSTRACT

An inline fan reverser (100) and related method for clearing away debris from a radiator (20) by programmatically reversing a vehicle's radiator fan (30). The fan reverser (100) electrically connects, inline, with the conductors that normally drive the electric motor (32) that turns the fan (31) in order to pull cooling air through the radiator (20) The fan reverser (100) includes a microcontroller that initially clears the radiator (20) of debris by pushing or blowing for a short period of time (e.g. 10 seconds) and then enters a main loop where the fan reverser repeatedly transitions between a cooling phase and a cleaning phase. In the cooling phase, the reverser pulls air through the radiator for a long period of time (e.g. 10 minutes). In the cleaning phase, the reverser periodically clears the radiator (20) of debris by pushing or blowing for a short period of time (e.g. 10 seconds). The reverser also provides for short OFF periods (e.g. 5 seconds) after each forward or reverse phase where power is removed from the fan (30) in order to allow the fan to slow down, or stop, before reversing direction.

15 Claims, 9 Drawing Sheets

PROGRAMMING PORT

FIG. 13

INLINE COOLING FAN REVERSER

RELATED APPLICATIONS

This application claims the benefit of U.S. Provisional Patent Application Ser. No. 61/715,807, filed Oct. 18, 2012.

BACKGROUND OF THE INVENTION

1. Technical Field

This application relates generally to vehicles and other equipment that include water cooled engines having radiators and electric cooling fans (e.g. powersports vehicles and zero-turn mowers) and, more particularly, to a micro-electronic, programmable inline cooling fan reverser that periodically reverses the fan to clean debris from the radiator and keep it and the related engine running cool.

2. Description of the Related Art

There are many examples of vehicles and equipment that use water cooled engines having radiators and electric cooling fans. An all-terrain vehicle (ATV) is an example of a powersports vehicle that often uses a 4-stroke liquid-cooled combustion engine. In operation, a pump circulates the coolant through internal cooling passages within the engine and then to a radiator. The radiator, of course, is a network of coolant transport tubes that are surrounded by fins to allow air to draw heat from the coolant. Many such systems use an electric radiator fan, often thermostatically-triggered at a predetermined temperature, to increase the air flow in high-heat or low-speed conditions.

Unfortunately, the cooling capacity of the radiator can be compromised whenever the radiator fins or air passage leading to those fins become clogged with debris that is sprayed onto the radiator or pulled against the radiator by the fan's normal operation.

It is important that any solution be cost effective for use with new equipment and easy to install in existing equipment. There are existing fan controllers, but none of the controllers known to the inventor operate as a simple, in-line reverser. Rather, they usually overcomplicate the situation by requiring a separate connection to the battery, or by adding temperature sensors and then spinning the fan at one speed when the temperature is at one level and at a faster speed when the temperature is at a higher level.

There remains a need, therefore, for an inline fan reverser for automatically clearing away the debris in an effective, yet inexpensive and easy-to-install manner.

SUMMARY OF THE INVENTION

It is a primary object of this invention to provide an inline fan reverser and related method for automatically clearing away debris from a radiator in an effective manner. It is another object of this invention to provide an inline reverser that is effective and may be installed by the manufacturer or by the end-user in an inexpensive and easy-to-install manner.

In one aspect, the invention comprises an inline motor reverser for automatically removing radiator debris on a motor vehicle that has an internal combustion engine, a radiator, a fan located behind the radiator for pulling cooling air through the radiator, an electric motor that turns the fan, and conductors for providing a voltage of forward polarity when energized, comprising electrical inputs that receive the voltage from the conductors; electrical outputs that output voltage to the electric motor; and control circuitry operatively located between the electrical inputs and the electrical outputs, the control circuitry controlling the electrical outputs by: (1) outputting a forward polarity voltage on the electrical outputs during a cooling period to turn the electric motor and fan connected thereto in a forward cooling direction that pulls cooling air through the radiator; (2) disabling the electrical outputs during a post-cool off period to allow the electric motor and fan connected thereto to rotationally slow before reversing direction; (3) outputting a reverse polarity voltage on the electrical outputs during a cleaning period to turn the electric motor and fan connected thereto in a reverse cleaning direction that pushes air through the radiator and blows debris away from an exterior side of the radiator; and (4) disabling the electrical outputs during a post-clean power-off period to allow the electric motor and fan connected thereto to rotationally slow before reversing direction; wherein operations (1) to (4) are repeatedly performed by the control circuitry while the electrical inputs are receiving voltage from the conductors.

In another aspect, the invention comprises a method of automatically removing radiator debris on a motor vehicle that has an internal combustion engine, a radiator, a fan located behind the radiator for pulling cooling air through the radiator, an electric motor that turns the fan, and conductors for providing a voltage of forward polarity when energized, the method comprising the steps of: providing an inline motor reverser having electrical inputs that receive the voltage from the conductors, electrical outputs that output voltage to the electric motor, and control circuitry operatively located between the electrical inputs and the electrical outputs, the control circuitry: (1) outputting a forward polarity voltage on the electrical outputs during a cooling period to turn the electric motor and fan connected thereto in a forward cooling direction that pulls cooling air through the radiator; (2) disabling the electrical outputs during a post-cool off period to allow the electric motor and fan connected thereto to rotationally slow before reversing direction; (3) outputting a reverse polarity voltage on the electrical outputs during a cleaning period to turn the electric motor and fan connected thereto in a reverse cleaning direction that pushes air through the radiator and blows debris away from an exterior side of the radiator; and (4) disabling the electrical outputs during a post-clean power-off period to allow the electric motor and fan connected thereto to rotationally slow before reversing direction; wherein operations (1) to (4) are repeatedly performed by the control circuitry while the electrical inputs are receiving voltage from the conductors.

The reverser may be beneficially provided with mating conductors that mate with original equipment and permit rapid inline installation without requiring tools.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

PREFERRED EMBODIMENTS OF THE INVENTION

The presently preferred embodiment resides in a microelectronic, programmable inline fan reverser 100. The preferred reverser 100 automatically runs through a pre-programmed cycle of spinning the fan 30 in a reverse cleaning direction for a brief period of time, and then in a forward cooling direction for the lion's share of the time, so that the fan 30 periodically cleans the radiator 20 and keeps it running cool.

Figure 1:
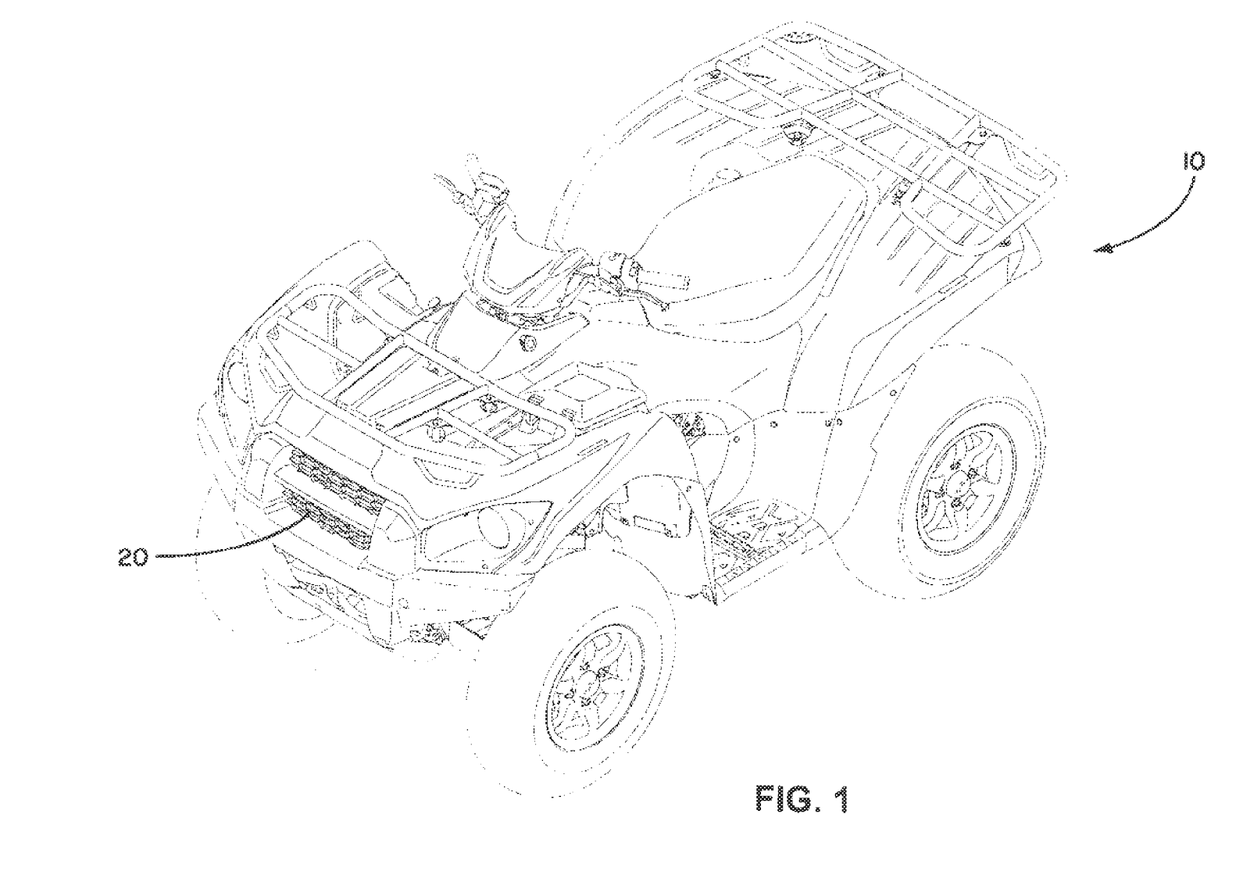
FIG. 1 is a perspective view of a typical ATV 10 that includes a radiator 20 (see also FIG. 2) and electrical fan 30 (not shown, but see FIG. 2) that is thermostatically operated to pull cooling air through the radiator.
Figure 2:
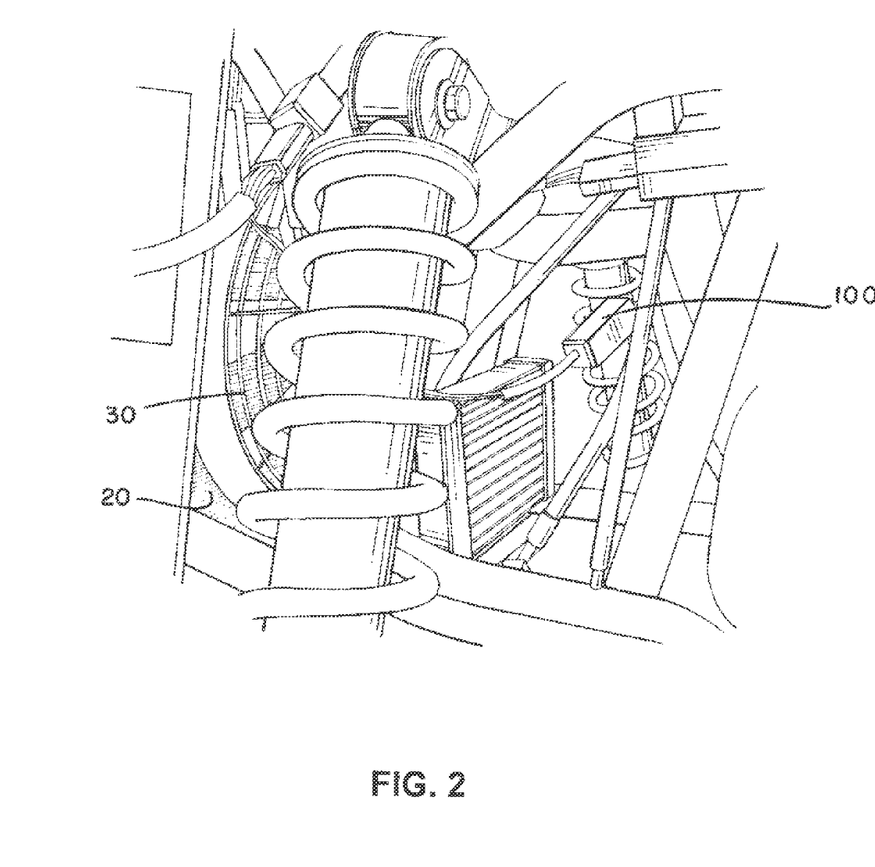
FIG. 2 is a close-up view of the ATV 10 while looking forward from the left wheel well, showing the back side of the radiator 20 and the electric fan 30 that is located behind the radiator 20 to pull cooling air through the radiator 20 when turning in the normal direction, and a presently preferred reverser 100 for using the fan 30 to push air through and clear debris from the front side of the radiator 20.

FIG. 1 shows a typical ATV 10. FIG. 2 is a close-up view of the ATV's chassis, showing the radiator 20, along with a fan reverser 100 according to a preferred embodiment of the present invention. As shown, the preferred reverser 100 is very small (1"×1"×2") and just plugs inline to the two existing fan wires of the 12V DC fans on vehicles such as the ATV 10 of FIGS. 1 and 2.

Figure 4:
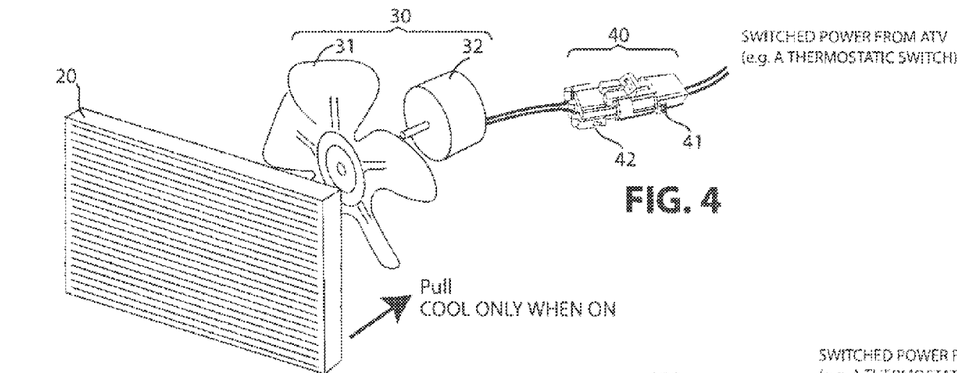
FIG. 4 is a simplified perspective view of a relevant portion of the ATV 10 showing the radiator 20, the electric fan 30 (comprised of a fan 31 and an electric motor 32), and a pair of conductors (e.g. +12V and GND) that are connected to an ATV power source via an electrical connector 40 (comprised of female connector 41 and male connector 42) that, when switched on, drives the electric fan 30 in a direction that pulls cooling air through the radiator 20.

The fan reverser 100 is an elegant idea with big ramifications for such vehicles. In particular, as shown in FIG. 4, the 12V DC fan 30 is typically mounted on the back side of the radiator 20 and driven to pull air through the radiator 20 to cool the liquid used to remove heat from the internal combustion engine. This pull-through cooling tends to also pull loose, lightweight debris up against the radiator 20 which, in mowing applications where it is dry and dusty, can quickly create an overheating issue which requires the driver to stop the vehicle and physically clear the radiator 20. A programmed reverser 100 according to embodiments of this invention periodically and fully automatically reverses the air flow to blow the debris off the radiator 20. In the preferred embodiment, the frequency and duration of the reversed operation can be programmed to be whatever an OEM or operator believes is best and can be loaded into a miniature CPU associated with the reverser 100.

Figure 3:
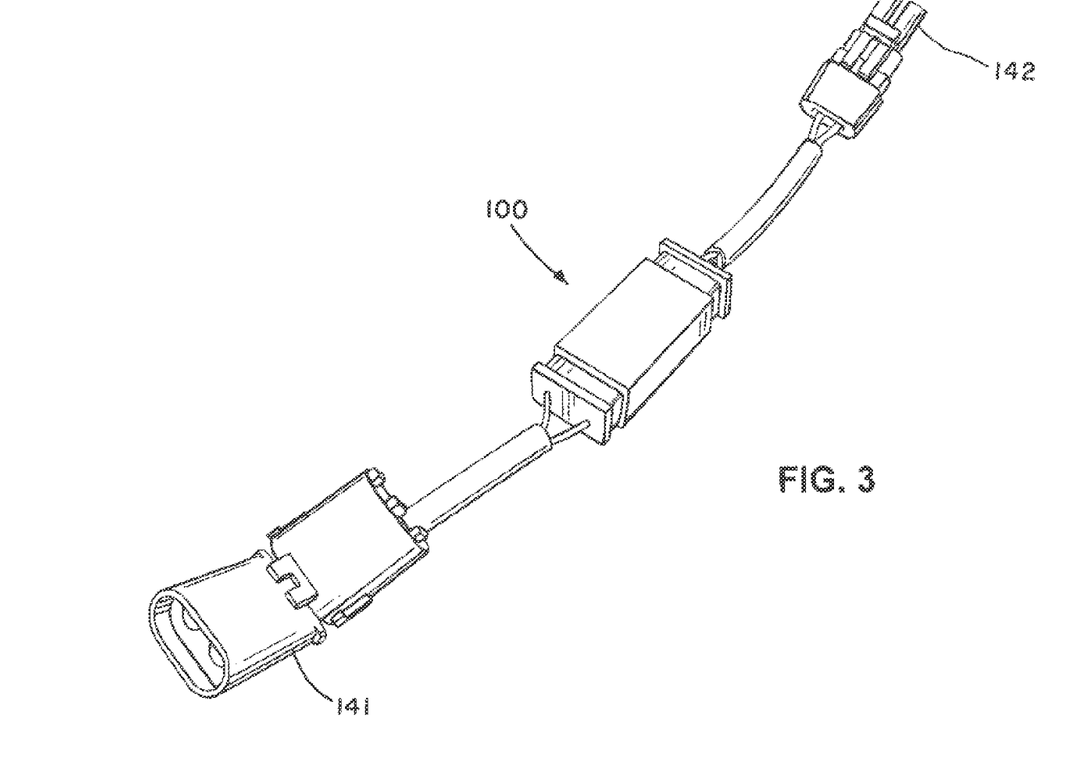
FIG. 3 is a perspective view of the presently preferred reverser 100 in a no-tool embodiment having plugs 121, 122 that are suitable for quick, plug-and-play installation in certain POLARIS® brand ATVs as explained further in FIGS. 4 and 5.
Figure 5:
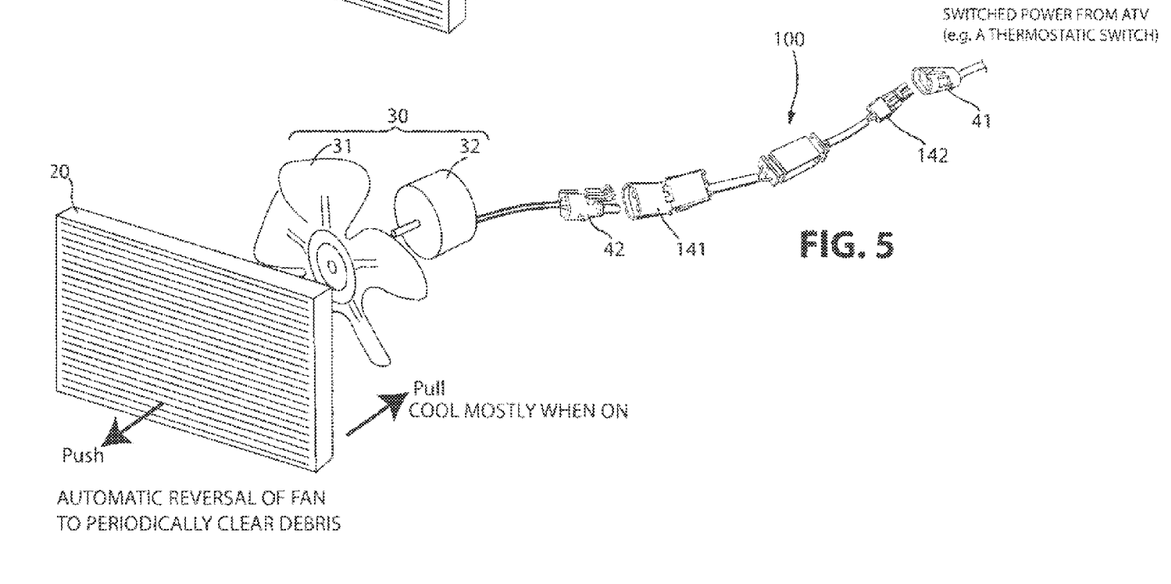
FIG. 5 is a simplified perspective view that shows how radiator 20 is both cooled and periodically cleaned and how the reverser 100 of FIG. 3 is quickly and easily installed by simply disconnecting the male and female halves 41, 42 of the standard connector 40 and then inserting the reverser 100 into the circuit, inline, by connecting original female plug 41 to the reverser's mail plug 142 and by connecting the reverser's female plug 141 to the original male connector 42.

FIG. 3 is a perspective view of the presently preferred reverser 100 in a no-tool embodiment having plugs 121, 122 that are suitable for quick, plug-and-play installation in certain POLARIS® brand ATVs as explained further in FIGS. 4 and 5;

FIG. 4 is a simplified perspective view of the radiator cooling portion of the ATV 10 prior to installation of the reverser 100. As shown, the radiator cooling portion includes the electric fan 30 (comprised of a fan 31 and an electric motor 32), and a pair of conductors (e.g. +12V and GND) that are connected to ATV power via an electrical connector 40 (comprised of female connector 41 and male connector 42). when switched on, the electric motor 32 drives the fan 31 in a direction that pulls cooling air through the radiator 20.

FIG. 5 shows the radiator cooling portion of FIG. 4 after installation of the reverser 100. As a result, the radiator 20 is now both cooled and periodically cleaned. In the illustrated embodiment, the reverser 100 of FIG. 3 is quickly and easily installed by simply disconnecting the male and female halves 41, 42 of the standard connector 40 and then inserting the reverser 100 into the circuit, inline, by connecting original female plug 41 to the reverser's mail plug 142 and by connecting the reverser's female plug 141 to the original male connector 42. It should be expressly understood that the reverser 100 may be provided with different plugs that are suitable for different vehicle brands (e.g. POLARIS®, KAWASAKI®, and YAMAHA®). If the original fan is hardwired and not connected with a plug 40 as shown in FIG. 4, or is connected with plugs not provided with the reverser 100, the installer may simply cut the existing wires and install the inline reverser 100 using any suitable method of electrical connection.

Figure 6:
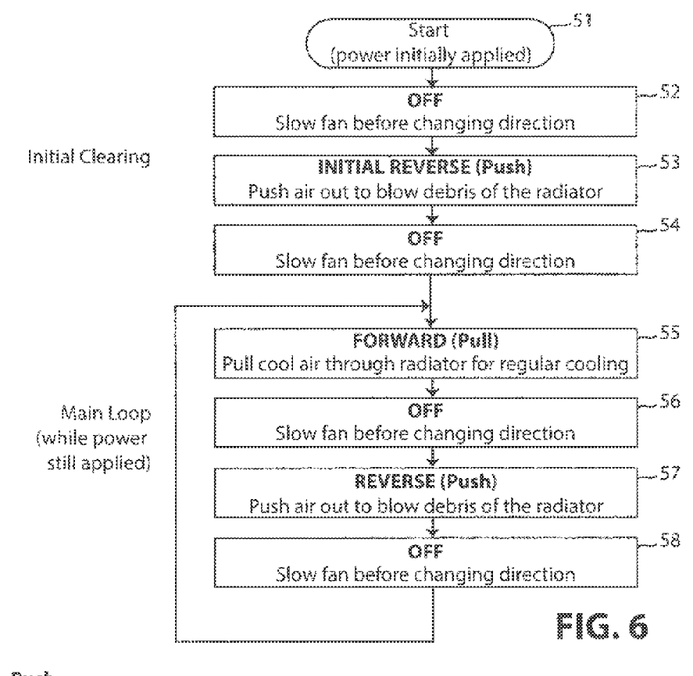
FIG. 6 is a flow chart illustrating the presently preferred steps after power is applied (step 51) of initially clearing (steps 52 to 54) and then entering a repeated loop of cooling and clearing (steps 55 to 58), so long as power is applied.

In most vehicles, the fan is not provided with any power until the vehicle's cooling system thermostat reaches its set temperature. At that point, the in-line fan reverser 100 would receive power and would take programmatic control of the fan. As shown by the flowchart of FIG. 6, after power is initially applied in Step 51, the presently preferred control program operates with an initial cleaning phase and a main loop as follows:

- 10 seconds (reverse blowing): First kick on to clear any debris that may have accumulated on the radiator prior to the fan being turned on the first time during the vehicle's warm up.

5 seconds (power off): This allows the fan blades to come to a stop so the rotational momentum is removed before the power kicks on in the opposite direction (fan to shaft key protection)

10 minutes (pull through): Regular cooling

After that the initial cleaning of Steps 52 to 54, the main loop cycle (Steps 55 to 58) just continues so long as power is present—pull for 10 minutes, off for 5 seconds, push for 10 seconds, off 5 seconds—repeat.

Figure 7:
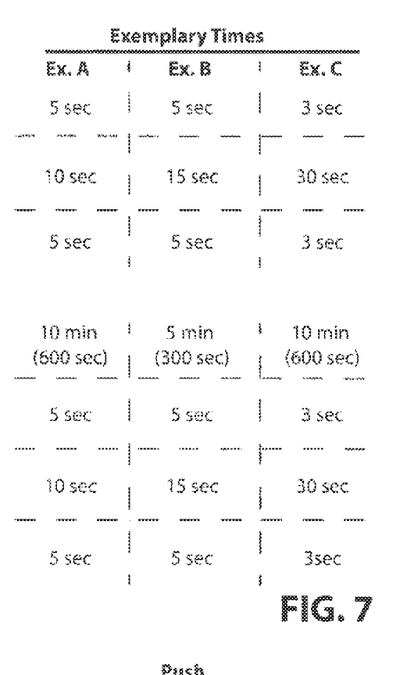
FIG. 7 is a table of exemplary times that may be used for the various steps 52 to 58 shown in FIG. 6.
Figure 8:
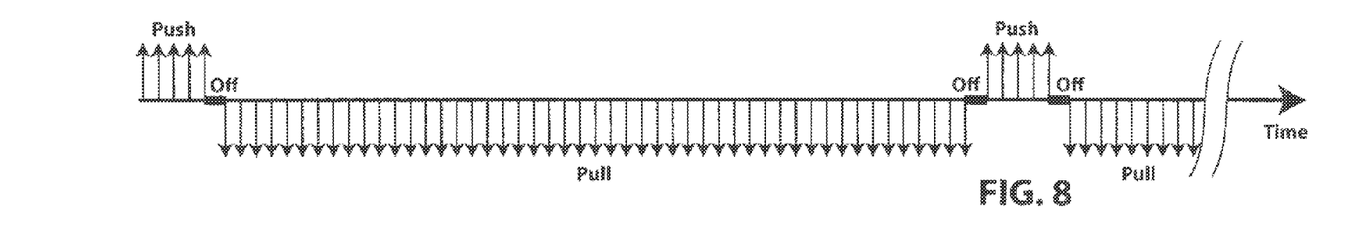
FIG. 8 is a graphic illustration of the flow chart of FIG. 6 showing the initial clearing (Push-Off) followed by the main loop of cooling and clearing (Pull-Off-Push-Off).

If an OEM wants different times for reverse, forward, or off, it is a simple matter to have a different program loaded at the time of manufacturer (presently preferred program is not field changeable). FIG. 7 is a table of exemplary times that may be used for the various steps 52 to 58 shown in FIG. 6.

Figure 9A:
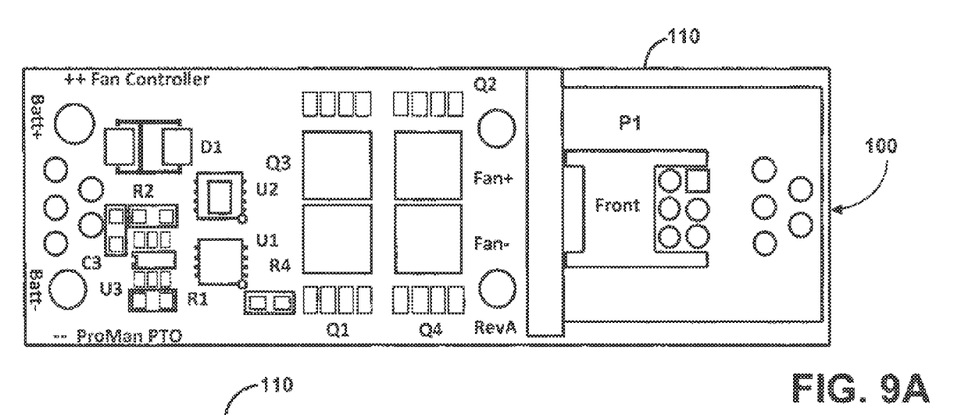
FIGS. 9A and 9B are top and bottom view, respectively, of a circuit board 110 used to implement the presently preferred reverser 100.
Figure 9B:
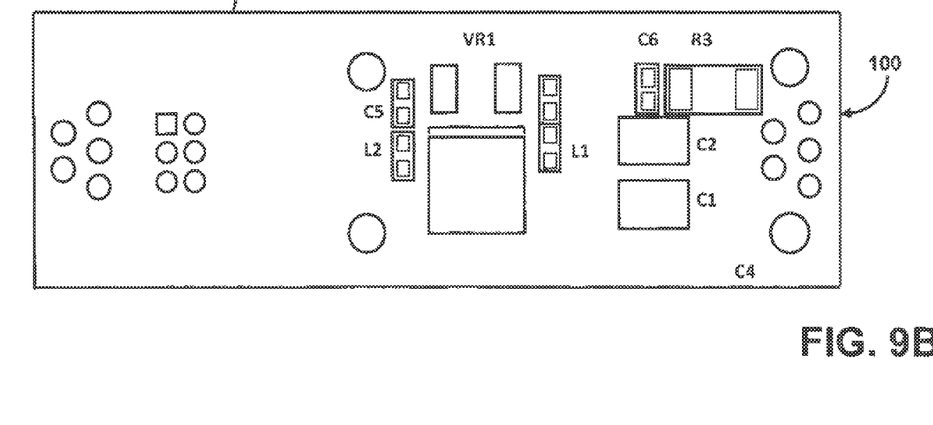

The fan which normally receives just two wires (e.g. +12 and GND), one of which is ordinarily switched on and off with a thermostatically-controlled switch. As suggested by FIGS. 2 to 5, and by the circuit board 110 of FIGS. 9A and 9B, the presently preferred reverser 100 is easily installed in-line with these two wires. In other words, if installed as a retrofit, one simply cuts the two wires and installs the reverser 100 in-line with those wires such that there are two wires coming in and two wires going out of the reverser 100. Operating under the command of the PIC controller, as suggested by FIGS. 9A and 9B, the reverser 100 will pass the voltage in a straight-through fashion to drive the fan 30 in the normal direction (i.e. Batt+ to Fan+ and Batt− to Fan−), pass the voltage in a crossed-over fashion to drive the fan 30 in a reversed direction (i.e. Batt+ to Fan− and Batt− to Fan+), or not pass the voltage at all and provide an open circuit on Fan−, Fan+, or both.

There are many possible embodiments, but the preferred circuitry used to implement the presently preferred reverser 100 is shown in FIGS. 10 to 14.

Figure 10:
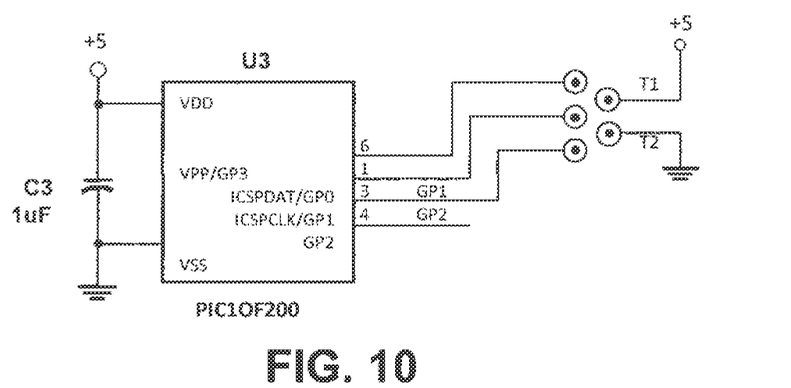
FIGS. 10 to 14 are schematic diagrams of the circuitry implemented on the circuit board 110.

FIG. 10 is a schematic diagram of the traces associated with the presently preferred Microchip® PIC10F200 8-bit CMOS microcontroller that is mounted on the circuit board 110 of FIGS. 3A and 3B as integrated circuit U3 and runs a suitable program for operating the reverser 100.

Figure 11:
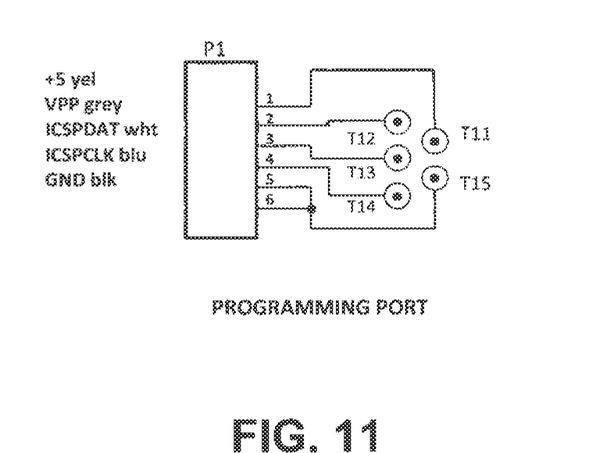

FIG. 11 is a schematic diagram of the programming port formed with plug P1 and terminals T11 to T15. A presently preferred program is set forth in Appendix A below.

Figure 12:
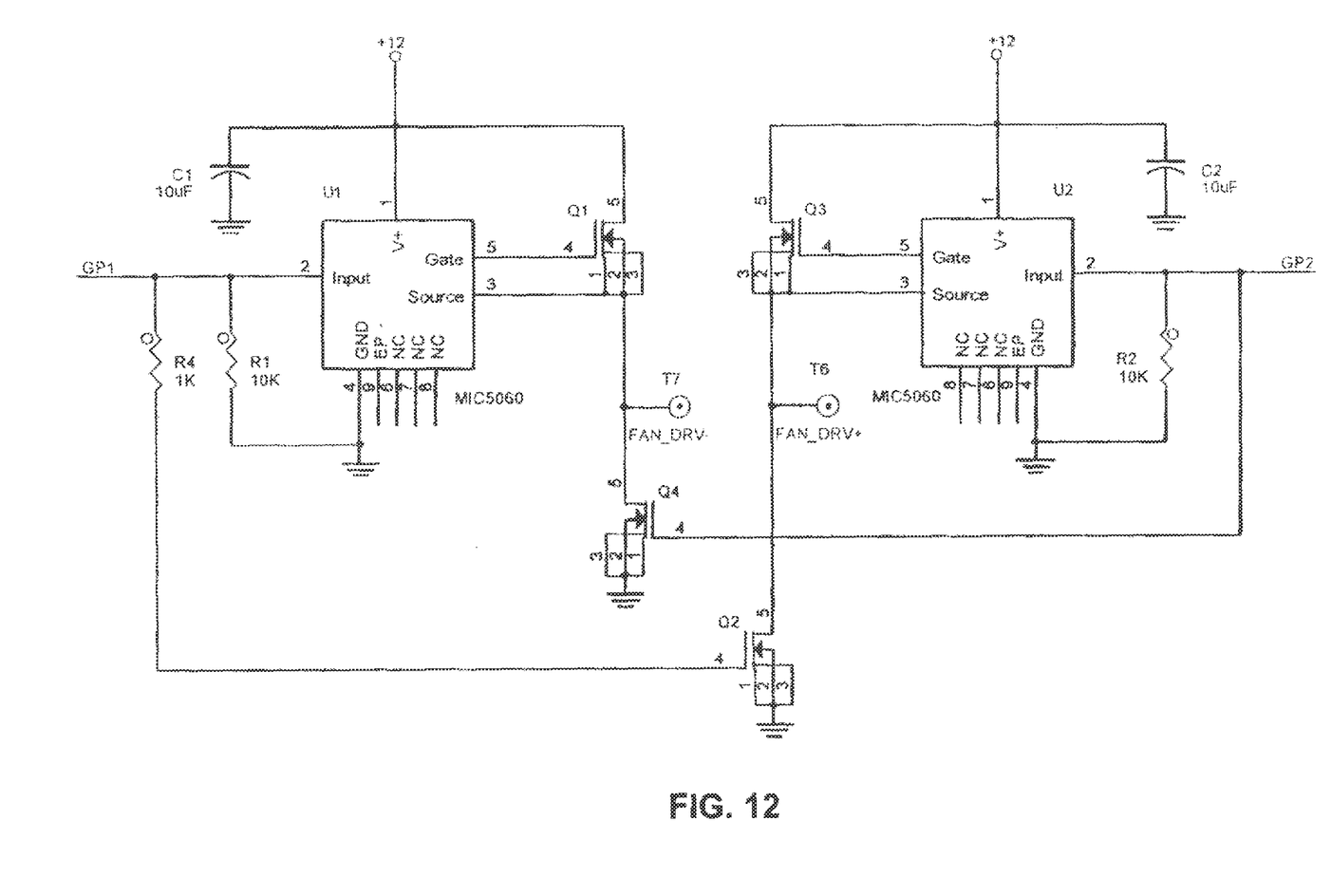

FIG. 12 is a schematic diagram of the fan drive circuitry comprising four MOSFETS Q1, Q2, Q3, Q4 and a pair of Micrel® MIC5060 MOSFET drivers U1 and U2, the circuit providing to fan drive outputs FAN_DRV− and FAN_DRV+ that are used to drive the electric fan 30 in one direction or the other according to the program running in the micrtocontroller U3.

Figure 13:
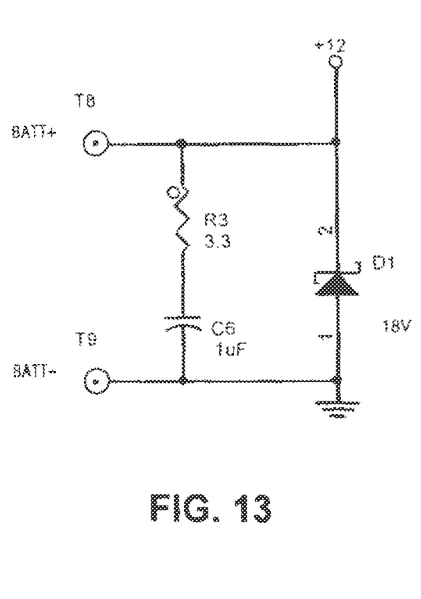

FIG. 13 is a schematic diagram of the battery-side circuitry comprising BATT− and BATT+ inputs, a resistor R3, a capacitor C6, and an 18V, 600 watt transient voltage suppressor diode Dl (e.g. a Fairchild Semiconductor® TVS diode, part no. SMBJ18A).

Figure 14:
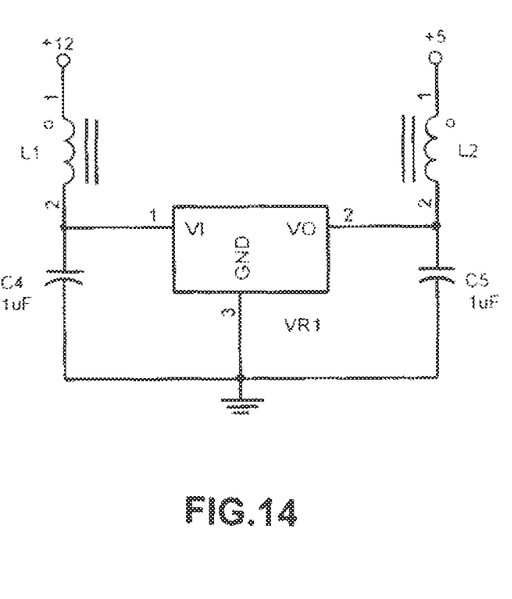

FIG. 14 is a schematic diagram of circuitry comprising a STMicroelectronics® L78M05ABDT linear voltage regulator VR1 that receives 12V on its voltage input terminal VI and produces 5V on its voltage output terminal VO, along with associated inductors and capacitors.

Many other embodiments are possible without departing from the spirit and scope of the present invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

APPENDIX A

```
;###############################################################
;this is for the ProMan PTO fan reverser
;it reverses the radiator fan on periodically to clean it out.
;###############################################################
       ;     list p=16f877A
             #define _PIC10xxx
             include <P10F200.INC>
```

```
            #include Fan.inc
            radix dec
w_temp          EQU         0x10        ; variable used for context saving
DelayH          EQU         0x11        ; high byte of timer delay
DelayL          equ         0x12        ;low byte of timer delay
GenDelay        EQU         0x13        ;general purpose delay decs count every 10ms
DEBUG_PORT      equ         GPIO
DEBUG_BIT       equ         2                       ;used to wiggle for test purposes
MTR_PORT        equ         GPIO
MTR_A           equ         1
MTR_B           equ         2
MOTOR_FWD       equ         4
MOTOR_REV       equ         2
MOTOR_OFF       equ         0
TMR_LD          equ         0x0A ;0x10              ;timer load value to get proper time delay
TMR_MS          equ 62      ;60                     ;ms per timer overflow
;on reset initial reverse fan time
INITIAL_REV_TIME equ        (10000/TMR_MS) ;10 seconds
;reverse fan time
;REV_TIME       equ         (30000/TMR_MS) ;30 sec
REV_TIME        equ         (15000/TMR_MS) ;15 sec
;forward fan time
;FWD_TIME       equ         (600000/TMR_MS) ;10 min
FWD_TIME        equ         (300000/TMR_MS) ;5 min
;FWD_TIME       equ         (10000/TMR_MS)
;fan off time between directions
;OFF_TIME       equ         (3000/TMR_MS)   ;3 sec
OFF_TIME        equ         (5000/TMR_MS)   ;5 sec
                                        ;used in checking flag status in non blocking mode
Starthere       org         0x0000
                goto        Start
        org     0x0004
Start
        movwf   OSCCAL
        movlw   MOTOR_OFF
        movwf   GPIO
        movlw   0x8                     ;make GP0-GP2 outputs
        TRIS    GPIO
        movlw   MOTOR_OFF
        movwf   GPIO
        movlw   0xc7
        OPTION
        movlw   TMR_LD                  ;relod the timer
        movwf   TMR0
        movlw   #high OFF_TIME/5        ;start with a short time off
        movwf   DelayH
        movlw   #low OFF_TIME/5
        movwf   DelayL
        call    Delay
        movlw   MOTOR_REV               ;run in reverse for a little while after reset
        movwf   GPIO
        movlw   #high INITIAL_REV_TIME
        movwf   DelayH
        movlw   #low INITIAL_REV_TIME
        movwf   DelayL
        call    Delay
        movlw   MOTOR_OFF
        movwf   GPIO
        movlw   #high OFF_TIME
        movwf   DelayH
        movlw   #low OFF_TIME
        movwf   DelayL
        call    Delay
MainLoop
        movlw   TMR_LD                  ;reload the timer
        movwf   TMR0
        movlw   MOTOR_FWD
        movwf   GPIO
        movlw   #high FWD_TIME
        movwf   DelayH
        movlw   #low FWD_TIME
        movwf   DelayL
        call    Delay
        movlw   MOTOR_OFF
        movwf   GPIO
        movlw   #high OFF_TIME
        movwf   DelayH
        movlw   #low OFF_TIME
        movwf   DelayL
        call    Delay
        movlw   MOTOR_REV
```

```
        movwf    GPIO
        movlw    #high REV_TIME
        movwf    DelayH
        movlw    #low REV_TIME
        movwf    DelayL
        call     Delay
        movlw    MOTOR_OFF
        movwf    GPIO
        movlw    #high OFF_TIME
        movwf    DelayH
        movlw    #low
        movwf    DelayL
        call     Delay
;wt2:
;       movf     TMR0, w           ; move status register into W register
;       btfss    STATUS, Z         ;wrapped around to 0 yet?
;       goto     wt2
;       movlw    TMR_LD            ;reload the time
;       movwf    TMR0
        goto     MainLoop
Delay
        movlw    TMR_LD             ;reload the time
        movwf    TMR0
wt1:
        movf     TMR0, w           ; move status register into W register
        btfss    STATUS, Z         ;wrapped around to 0 yet?
        goto     wt1
        movlw    TMR_LD            ;reload the time
        movwf    TMR0
        movf     DelayL, w
        BNE      L0
        decf     DelayH
        decf     DelayL
        goto     DoneDec
L0
        decf     DelayL
        BNE      DoneDec
        movf     DelayH, w
        BEQ      DecFinished
DoneDec
        goto     wt1
DeFinished
        retlw    0
    end
```

The invention claimed is:

1. An inline motor reverser for automatically removing radiator debris on a motor vehicle that has an internal combustion engine, a radiator, a fan located behind the radiator for pulling cooling air through the radiator, an electric motor that turns the fan, and conductors for providing a voltage of forward polarity when energized, comprising:
   electrical inputs that receive the voltage from the conductors;
   electrical outputs that output voltage to the electric motor; and
   control circuitry operatively located between the electrical inputs and the electrical outputs, the control circuitry controlling the electrical outputs by:
   (1) outputting a forward polarity voltage on the electrical outputs during a cooling period to turn the electric motor and fan connected thereto in a forward cooling direction that pulls cooling air through the radiator;
   (2) disabling the electrical outputs during a post-cool off period to allow the electric motor and fan connected thereto to rotationally slow before reversing direction;
   (3) outputting a reverse polarity voltage on the electrical outputs during a cleaning period to turn the electric motor and fan connected thereto in a reverse cleaning direction that pushes air through the radiator and blows debris away from an exterior side of the radiator; and
   (4) disabling the electrical outputs during a post-clean power-off period to allow the electric motor and fan connected thereto to rotationally slow before reversing direction;
   wherein operations (1) to (4) are repeatedly performed by the control circuitry while the electrical inputs are receiving voltage from the conductors.

2. The inline motor reverser of claim 1 wherein at least one of the conductors for providing a voltage of forward polarity is switched on with a thermostatically-controlled switch and wherein the control circuitry pre-cleans the radiator debris by doing the following just after the voltage of forward polarity is switched on:
   (1) outputting a reverse polarity voltage on the electrical outputs during a pre-cleaning period to turn the electric motor and fan connected thereto in a reverse cleaning direction that pushes air through the radiator and blows debris away from an exterior side of the radiator; and
   (2) disabling the electrical outputs during a post-clean power-off period to allow the electric motor and fan connected thereto to rotationally slow before reversing direction.

3. The inline motor reverser of claim 1 wherein the control circuitry comprises a microcontroller that programmatic controls the electric motor and fan.

4. The inline motor reverser of claim 3 wherein the cooling period, post-cool off period, cleaning period, and post-clean power-off period are programmatically set.

5. The inline motor reverser of claim 1 wherein the cooling period is one minute or more and wherein the cleaning period is 30 seconds or less.

6. The inline motor reverser of claim 5 wherein the cooling period is about 10 minutes and the cleaning period is about 10 seconds.

7. The inline motor reverser of claim 1 wherein the electrical inputs are provided in one type of a mating pair of plugs and wherein the electrical outputs are provided in an opposite type of the mating pair of plugs to enable a user to readily install the inline motor reverser, without tools, when the conductors for providing a voltage of forward polarity are, prior to insertion of the inline motor reverser, connected to the electric motor with a corresponding pair of plugs.

8. A method of automatically removing radiator debris on a motor vehicle that has an internal combustion engine, a radiator, a fan located behind the radiator for pulling cooling air through the radiator, an electric motor that turns the fan, and conductors for providing a voltage of forward polarity when energized, the method comprising the steps of:
   providing an inline motor reverser having electrical inputs that receive the voltage from the conductors, electrical outputs that output voltage to the electric motor, and control circuitry operatively located between the electrical inputs and the electrical outputs, the control circuitry:
   (1) outputting a forward polarity voltage on the electrical outputs during a cooling period to turn the electric motor and fan connected thereto in a forward cooling direction that pulls cooling air through the radiator;
   (2) disabling the electrical outputs during a post-cool off period to allow the electric motor and fan connected thereto to rotationally slow before reversing direction;
   (3) outputting a reverse polarity voltage on the electrical outputs during a cleaning period to turn the electric motor and fan connected thereto in a reverse cleaning direction that pushes air through the radiator and blows debris away from an exterior side of the radiator; and
   (4) disabling the electrical outputs during a post-clean power-off period to allow the electric motor and fan connected thereto to rotationally slow before reversing direction;
   wherein operations (1) to (4) are repeatedly performed by the control circuitry while the electrical inputs are receiving voltage from the conductors.

9. The method of claim 8 wherein at least one of the conductors for providing a voltage of forward polarity is switched on with a thermostatically-controlled switch and wherein the method further comprises:
   just after the voltage of forward polarity is switched on:
   (1) outputting a reverse polarity voltage on the electrical outputs during a pre-cleaning period to turn the electric motor and fan connected thereto in a reverse cleaning direction that pushes air through the radiator and blows debris away from an exterior side of the radiator; and
   (2) disabling the electrical outputs during a post-clean power-off period to allow the electric motor and fan connected thereto to rotationally slow before reversing direction.

10. The method of claim 8 wherein the control circuitry comprises a microcontroller that programmatic controls the electric motor and fan.

11. The method of claim 10 wherein the cooling period, post-cool off period, cleaning period, and post-clean power-off period are programmatically set.

12. The method of claim 8 wherein the cooling period is one minute or more and wherein the cleaning period is 30 seconds or less.

13. The method of claim 12 wherein the cooling period is about 10 minutes and the cleaning period is about 10 seconds.

14. The method of claim 8 wherein the electrical inputs are provided in one type of a mating pair of plugs and wherein the electrical outputs are provided in an opposite type of the mating pair of plugs to enable a user to readily install the inline motor reverser, without tools, when the conductors for providing a voltage of forward polarity are, prior to insertion of the inline motor reverser, connected to the electric motor with a corresponding pair of plugs.

15. A method of automatically removing radiator debris on a motor vehicle that has an internal combustion engine, a radiator, a fan located behind the radiator for pulling cooling air through the radiator, an electric motor that turns the fan, and conductors for providing a voltage of forward polarity when energized, the method comprising the steps of:
   (1) outputting a reverse polarity voltage on the electrical outputs after the voltage of forward polarity is switched on, during a pre-cleaning period, to turn the electric motor and fan connected thereto in a reverse cleaning direction that pushes air through the radiator and blows debris away from an exterior side of the radiator; and
   (2) disabling the electrical outputs during a post-clean power-off period to allow the electric motor and fan connected thereto to rotationally slow before reversing direction; and thereafter:
   (3) outputting a forward polarity voltage on the electrical outputs during a cooling period to turn the electric motor and fan connected thereto in a forward cooling direction that pulls cooling air through the radiator;
   (4) disabling the electrical outputs during a post-cool off period to allow the electric motor and fan connected thereto to rotationally slow before reversing direction;
   (5) outputting a reverse polarity voltage on the electrical outputs during a cleaning period to turn the electric motor and fan connected thereto in a reverse cleaning direction that pushes air through the radiator and blows debris away from an exterior side of the radiator; and
   (6) disabling the electrical outputs during a post-clean power-off period to allow the electric motor and fan connected thereto to rotationally slow before reversing direction;
   wherein operations (3) to (6) are repeatedly performed while the electrical inputs are receiving voltage from the conductors.

* * * * *